United States Patent
Cox et al.

(10) Patent No.: US 9,211,847 B1
(45) Date of Patent: Dec. 15, 2015

(54) HOSE LANDING SYSTEM KIT RVS AND THE LIKE

(71) Applicants: James R. Cox, Schulenburg, TX (US); Beverly L. Cox, Schulenburg, TX (US)

(72) Inventors: James R. Cox, Schulenburg, TX (US); Beverly L. Cox, Schulenburg, TX (US)

(*) Notice: Subject to any disclaimer, the term of this patent is extended or adjusted under 35 U.S.C. 154(b) by 0 days.

(21) Appl. No.: 14/257,640

(22) Filed: Apr. 21, 2014

(51) Int. Cl.
| F16L 3/00 | (2006.01) |
| B60R 11/00 | (2006.01) |
| B60R 15/00 | (2006.01) |

(52) U.S. Cl.
CPC ............... *B60R 11/00* (2013.01); *B60R 15/00* (2013.01); *B60R 2011/0082* (2013.01)

(58) Field of Classification Search
USPC .................................. 248/49, 75, 80, 83, 89
See application file for complete search history.

(56) References Cited

U.S. PATENT DOCUMENTS

| 2,846,168 | A | * | 8/1958 | Schroeter | 248/49 |
| 3,730,228 | A | * | 5/1973 | Gibbs, Sr. | 138/106 |
| 3,819,137 | A | * | 6/1974 | Smith | 248/49 |
| 4,082,242 | A | | 4/1978 | Smith | |
| 4,169,571 | A | * | 10/1979 | Duggan | 248/49 |
| 4,228,978 | A | | 10/1980 | Rand | |
| 4,715,570 | A | * | 12/1987 | Mashuda | 248/49 |
| 4,905,939 | A | | 3/1990 | Horn | |
| 5,431,455 | A | | 7/1995 | Seely | |
| 5,788,193 | A | * | 8/1998 | Hilbert | 248/80 |
| 6,332,595 | B1 | * | 12/2001 | Klucznik | 248/87 |
| 6,619,596 | B1 | | 9/2003 | Caine et al. | |
| 6,786,462 | B1 | | 9/2004 | Bland | |
| 7,425,028 | B1 | | 9/2008 | Angel et al. | |
| 7,926,768 | B2 | * | 4/2011 | Prest | 248/80 |

* cited by examiner

*Primary Examiner* — Steven Marsh
(74) *Attorney, Agent, or Firm* — Richard L Miller

(57) ABSTRACT

A hose landing system kit for supporting a hose of a recreational vehicle which comprises a hose support, at least two pairs of stanchions, and at least two bolts, which stanchions act with said support to create channels for the hose. The channels are at least as tall as the height of the hose, and allow the hose to be supported therein with greater ease of placement than prior art methods.

7 Claims, 3 Drawing Sheets

HOSE LANDING SYSTEM KIT RVS AND THE LIKE

BACKGROUND OF THE INVENTION

1. Field of the Invention

The present invention relates to a hose support, and more particularly, a HOSE LANDING SYSTEM KIT RVS AND THE LIKE.

2. Description of the Prior Art

Numerous innovations for recreational vehicle hose supports have been provided in the prior art that will be described. Even though these innovations may be suitable for the specific individual purposes to which they address, however, they differ from the present invention.

A FIRST EXAMPLE, U.S. Pat. No. 4,082,242, Published/Issued on Apr. 4, 1978, to Smith teaches an omnidirectional sewer hose support comprised of a multiplicity of interconnected arches of planar form adapted to be deflected from an adjacently related stored condition and into an angular relationship and upstanding condition extended in a zig-zag formation to transversely underlie the hose for its support and by engaging in the reinforcement configuration of the hose to prevent shifting thereof.

A SECOND EXAMPLE, U.S. Pat. No. 4,228,978, Published/Issued on Oct. 21, 1980, to Rand teaches a support for a flexible sewer hose attached to an RV. The support has at least two elongate, semi-circular sections which are relatively slidable to adjust the length of the support. Fastening means lock the sections once adjusted. The support is secured to the hose by flexible ties or securement means attachable to the hose.

A THIRD EXAMPLE, U.S. Pat. No. 4,905,939, Published/Issued on Mar. 6, 1990, to Horn teaches identical metal trough sections adapted for twist-lock attachment end to end. The twist-lock arrangement is built into the trough sections. No separate fasteners are required. The attached trough sections produce a half-round elongated member. The elongated member is useful for supporting and protecting expandible flexible sewer hose of the type normally used on motor homes and trailers for emptying holding tanks. After use, the elongated support member can be disassembled back into the smaller trough sections for storage.

A FOURTH EXAMPLE, U.S. Pat. No. 5,431,455, Published/Issued on Jul. 11, 1995, to Seely teaches a recreational vehicle sewer hose containment assembly comprising a plurality of rigid linear tubes telescopically mated to define a housing, with the housing adapted for receiving a sewer hose of a recreational vehicle therein and with the housing contractible in a stowed configuration and extendable in an operable configuration; an adjustment mechanism coupled to the housing for fixedly setting the telescopic extension and alignment of the tubes thereof; and a coupling mechanism coupleable to the housing and coupleable with a recipient surface therebelow for placing the housing in a stationary operable configuration.

A FIFTH EXAMPLE, U.S. Pat. No. 6,619,596, Published/Issued on Sep. 16, 2003, to Caine, et al. teaches a collapsible support is provided for a flexible RV sewer hose which includes in the preferred form, a plurality of pairs of identical arches. The height of each arch pair is different from the preceding arch pair to allow a sewer hose placed therein to properly flow by gravitational forces from the RV to a septic system. The arches of the support are hinged along the side so that each arch will cradle the sewage hose at an angle to the longitudinal axis of the sewer hose.

A SIXTH EXAMPLE, U.S. Pat. No. 6,786,462, Published/Issued on Sep. 7, 2004, to Bland teaches a RV sewage line stabilizing device is used to secure an elbow fitting, affixed to the end of an RV sewer hose, in place in a sewer receptacle. A bottom plate has a U-shaped collar formed in one end, and an open, three-sided box formed on the other end. The RV sewage line stabilizing device lays generally flat in close proximity to the ground, with the U-shaped collar fitting around the vertically extending portion of the elbow fitting. The U-shaped collar may rest on top of a flange formed around the elbow fitting, or a retaining strap may be secured over the horizontally extending portion of the elbow fitting to hold the elbow fitting down and in place. The open, three-sided box holds a brick, or other weights, in place to provide weight to secure and stabilize the elbow fitting, keeping the sewer hose in place.

A SEVENTH EXAMPLE, U.S. Pat. No. 7,425,028, Published/Issued on Sep. 16, 2008, to Angel, et al. teaches a sewer hose support handle provides for easy storage and manual transport of a standard foldable sewer hose support as are popular among recreational vehicle owners. The flexible handle is formed from plastic and includes a biased longitudinal member having parallel ends. Each of the handle ends includes a flange which can be positioned below the terminal sections of the sewer hose support. A grip affixed to the longitudinal member allows the combination sewer hose support and handle to be easily lifted and carried.

It is apparent now that numerous innovations for hose supports for RVs have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a HOSE LANDING SYSTEM KIT RVS AND THE LIKE that avoids the disadvantages of the prior art.

ANOTHER OBJECT of the present invention is to provide a HOSE LANDING SYSTEM KIT RVS AND THE LIKE that is simple and inexpensive to manufacture.

STILL ANOTHER OBJECT of the present invention is to provide a HOSE LANDING SYSTEM KIT RVS AND THE LIKE that is simple to use.

BRIEFLY STATED, STILL YET ANOTHER OBJECT of the present invention is to provide a HOSE LANDING SYSTEM KIT RVS AND THE LIKE that is easily disassemblable, and which allows a hose to be easily placed therein.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

Figure 1:
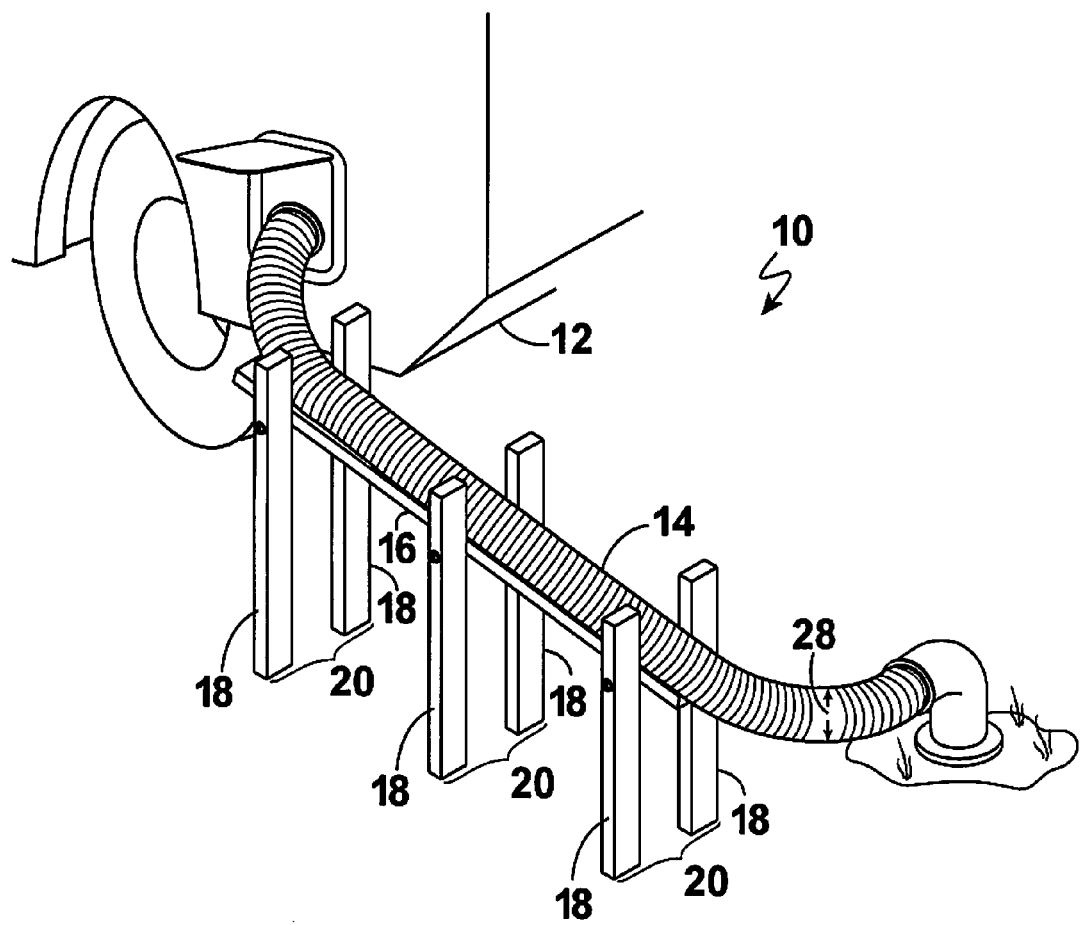
FIG. 1 is a diagrammatic perspective view of the present invention setup next to an RV with a landing hose installed and resting thereon.

A MARSHALING OF REFERENCE NUMERALS UTILIZED IN THE DRAWING 10 hose landing system kit
12 recreational vehicle
14 hose
16 hose support
18 stanchion
20 pair of stanchions 18
22 bolt
24 channel formed by stanchions 20 and hose support 16
26 sides of channel 24
28 diameter of hose 14
30 through-bores of hose support 16 and stanchions 18
32 height of stanchions 18
Δ angle of hose support 16
36 flat surface
38 portion of hose support 16 which extends past stanchions 18
40 tops of stanchions 18
42 distance between tops of stanchions 18 and through-bores 30
44 nuts
46 washers

DETAILED DESCRIPTION OF THE PREFERRED EMBODIMENT

Referring now to the figures, in which like numerals indicate like parts, and particularly to FIG. 1, disclosed is a hose landing system kit 10 for recreational vehicles 12 and the like which comprises:

a) a hose 14 support 16;
b) at least two pairs 20 of stanchions 18; and
c) at least two bolts 22.

The bolts 22 are for each securing one of the pairs 20 of stanchions 18 to the hose support 16. By their securement thereon, the stanchions 18 form sides 26 of a channel 24 when secured to the hose support 16 by the bolts 22. To facilitate holding the hose, the channel 24 formed by the stanchions 18 secured to the hose support 16 has sides 16 which extend at least as high as the diameter 28 of the hose 14 being supported.

Figure 2:
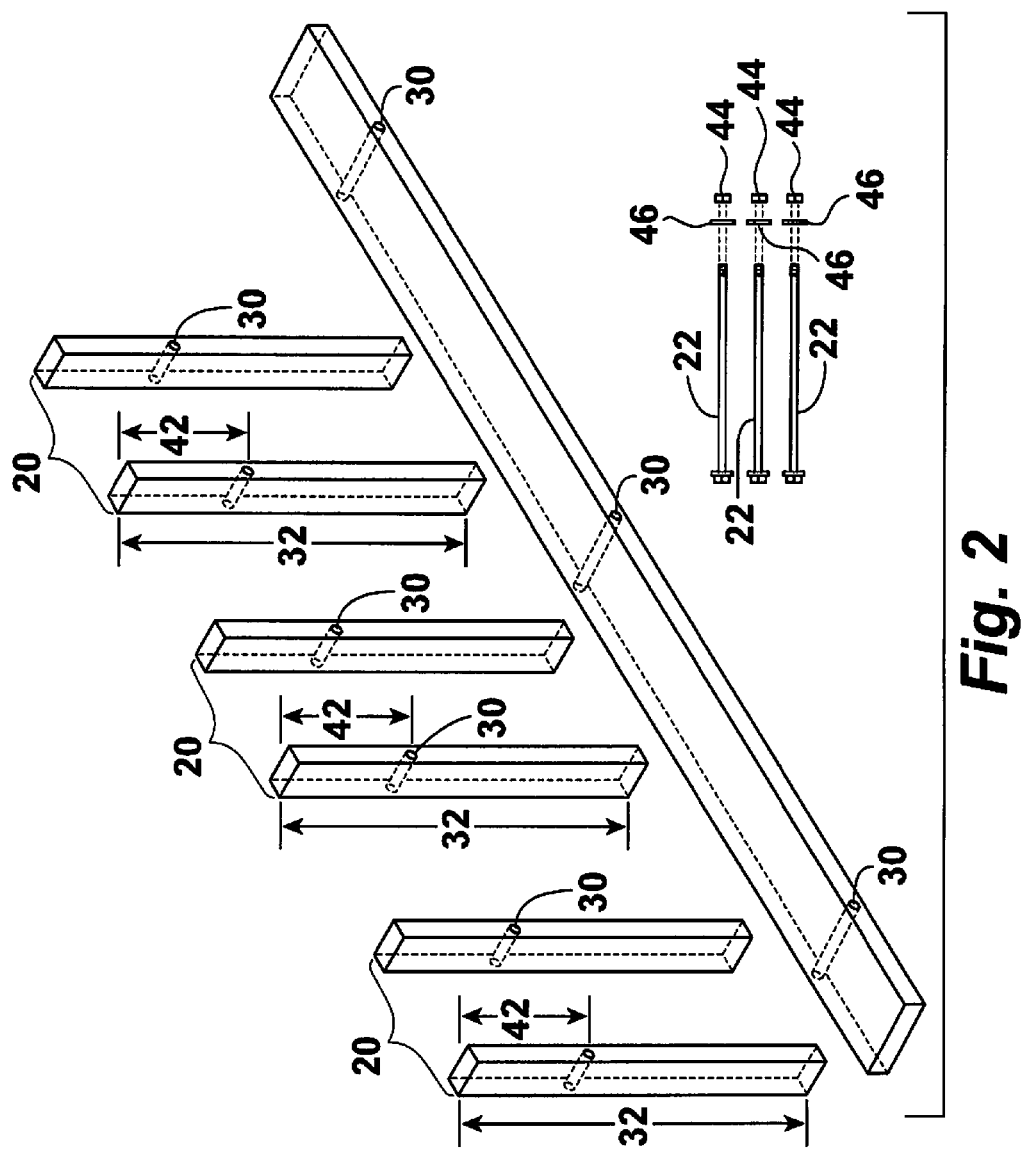
FIG. 2 is a diagrammatic perspective view of the present invention showing all the components disassembled from each other.
Figure 3:
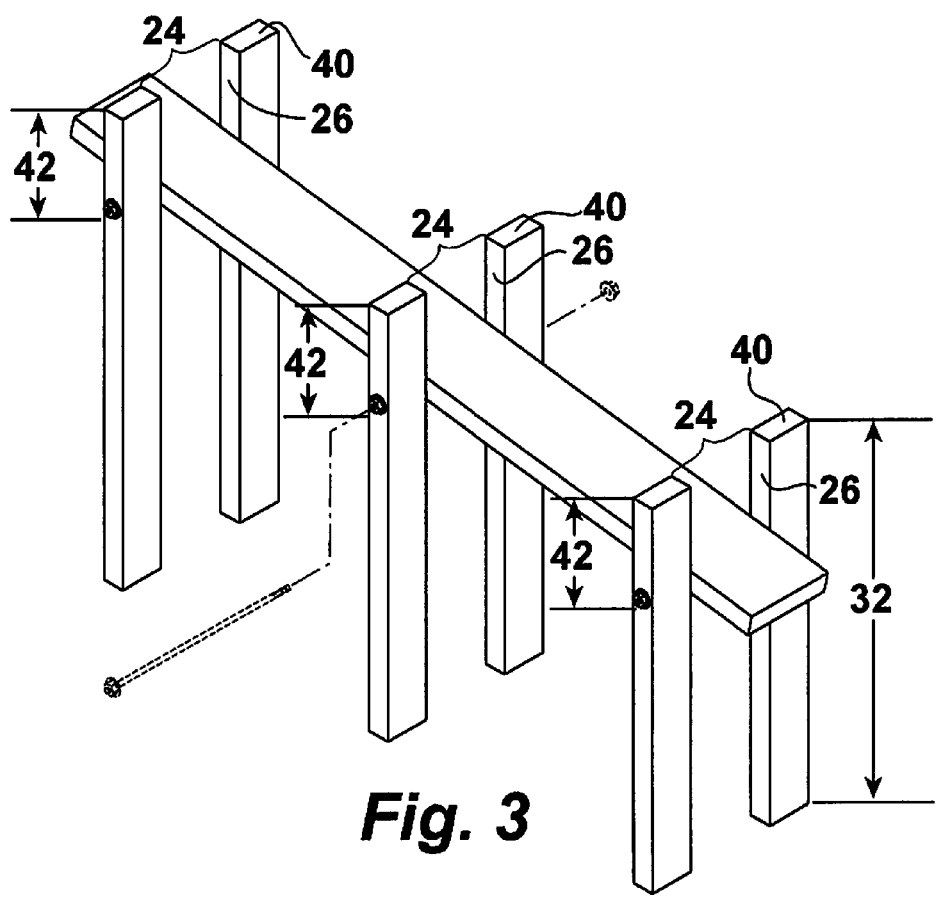
FIG. 3 is a diagrammatic perspective view of the present invention per se partially assembled with a last center bolt yet to be installed.
Figure 4:
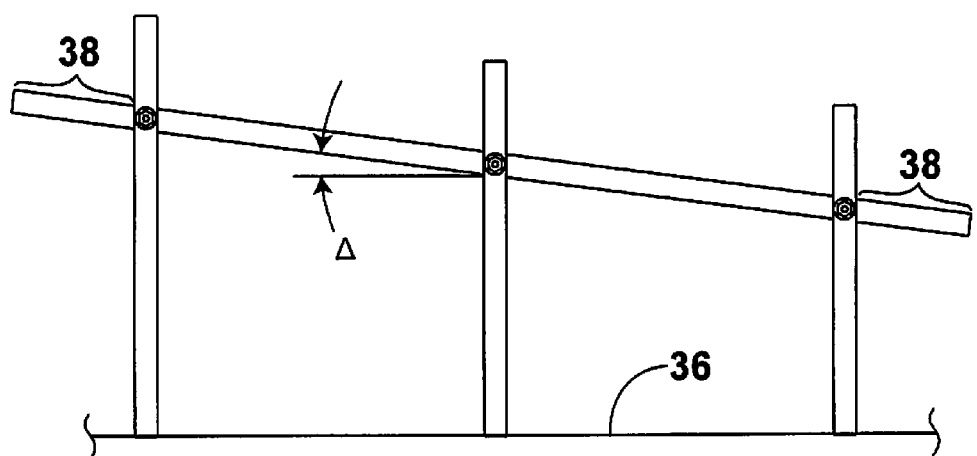
FIG. 4 is a side elevational view thereof.

Referring now to FIGS. 2-4, it is disclosed that to be attached, the hose support 16 and the stanchions 18 have corresponding through-bores 30, to permit the bolts 22 to secure them in pre-determined locations.

Each of the pairs 20 of stanchions 18 are of different heights, so that when the stanchions 18 are secured to the hose support 16 by the bolts 22 through the corresponding through-bores 30, the hose support 16 is held at an angle Δ when the stanchions 18 are placed on a flat surface 36. Additionally, the through-bores 30 on said hose support 16 are positioned such that when the corresponding stanchions 18 are attached, the hose support 16 has a portion which extends substantially beyond 38 the stanchions 18.

In a preferred embodiment, the at least two pairs 20 of stanchions 18 comprises three pairs 20 of stanchions 18, which three pairs 20 of stanchions 18 are all of different heights 32. To facilitate the channels of the invention, the through-bores 30 are all the same distance 42 from the tops 40 of the three pairs 20 of stanchions 18.

The kit 10 in a preferred embodiment includes nuts 44 and washers 46, so that the bolts 22 are removably securable by the nuts 44 and washers 46, and the kit 10 is disassemblable by releasing the nuts 44 and removing the bolts 22.

Differentiation from Prior Art Devices

The present kit 10 provides several advantages over other methods, including accordion-style systems such as those of Smith, semi-circular channel systems such as those of Rand, or systems for wholly enclosing a hose 14 such as Seely. In the first instance, all three of the prior art systems of Smith, Rand and Seely require the systems to encompass the hose along all of the length which it travels. In the case of the channel of Rand or the enclosing system of Seely, this is inherent to their structures.

In the case of an accordion system such as Smith, if the device did not come into very frequent contact with the hose, the panels of the accordion would have to be absurdly elongated. Specifically, in the case of Smith, the material must bend more as the supports are separated further; separating them to the degree of the present invention would likely break any sufficiently resilient material. In the case of the hinged accordion system of Brockington, the panels by physical necessity must contact the hose along its whole length. Further if the hinges of Brockington were applied to the system of Smith, then the entire device would simply collapse, since the weight of the hose 14 would be pushing the hinges open.

Thus, all of the prior art methods require constant or near-constant contact and alignment with the hose 14. However, hoses of the type in question are not always easily amenable to such contact. A large diameter 28 hose 14 may be quite difficult align perfectly straightly, and may not keep such alignment when there is irregular flow through the hose 14, or when temperatures change, or as a result of other environmental factors. The present invention, having the hose rest on a hose support 16 which normally has open sides, except for specific channels 24 formed by the stanchions 18, allows the hose 14 to be much more easily placed thereon by a user. Additionally, the overhanging portions 38 of the device which extend past the stanchions 18 allow the hose 14 to be still somewhat supported while it is turning, which by their necessary construction, the prior art methods cannot do.

It will be understood that each of the elements described above, or two or more together, may also find a useful application in other types of constructions differing from the types described above.

While the invention has been illustrated and described as embodiments of a HOSE LANDING SYSTEM KIT RVS AND THE LIKE, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A hose landing system kit for recreational vehicles which comprises:

a) a hose support;
b) at least two pairs of stanchions; and
c) at least two bolts;
wherein said bolts are for each securing one of said pairs of stanchions to said hose support;
wherein said stanchions form sides of a channel when secured to said hose support by said bolts; and
wherein each pair of stanchions are vertically oriented and parallel to each other so when a load carried by said each pair of stanchion is resolved, only a vertical component is present and no horizontal component is present so as to allow said each pair of stanchions to only have to transfer a vertical load and not a horizontal load.

2. The kit of claim 1 wherein said channel formed by said stanchions secured to said hose support extends at least as high as the diameter of the hose being supported.

3. The kit of claim 2 wherein said hose support and said stanchions have corresponding through-bores, to permit said bolts to secure them in pre-determined locations.

4. The kit of claim 3 wherein said at least two pairs of stanchions are of different heights, so that when said stanchions are secured to said hose support by said bolts through said corresponding through-bores, said hose support is held at a slope when the stanchions are placed on a flat surface.

5. The kit of claim 4, wherein said through bores on said hose support are positioned such that when said corresponding stanchions are attached, said hose support extends substantially beyond said stanchions.

6. The kit of claim 5 wherein said at least two pairs of stanchions comprises three pairs of stanchions;
wherein said three pairs of stanchions are all of different heights; and
wherein said through-bores are the same distance from the tops of said three pairs of stanchions.

7. The kit of claim 6 wherein said bolts are removably securable by nuts and washers; and
wherein said kit is disassemblable by releasing said nuts and removing said bolts.

\* \* \* \* \*